Nov. 11, 1952 J. A. MEISSNER 2,617,342
COMBINATION LIFT AND DRAWBAR FOR TRACTORS
Filed March 28, 1950 2 SHEETS—SHEET 1
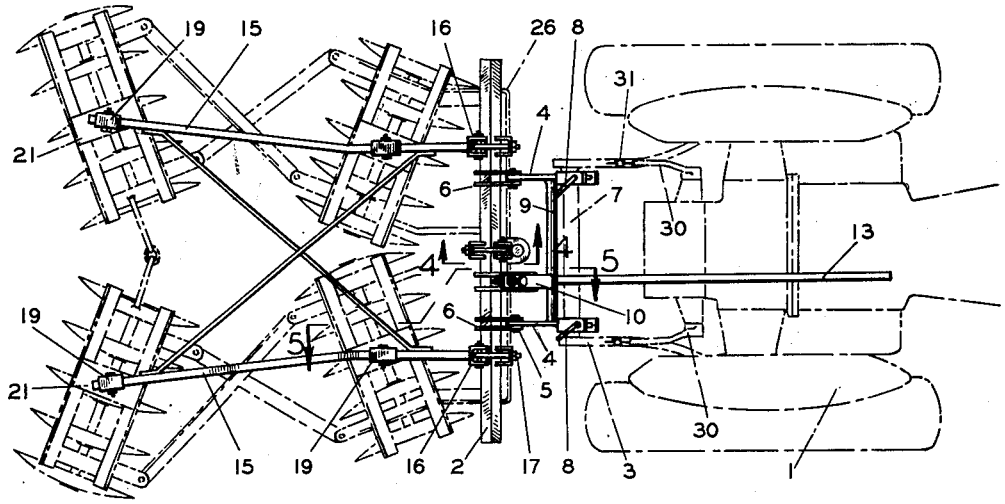
Fig. 1
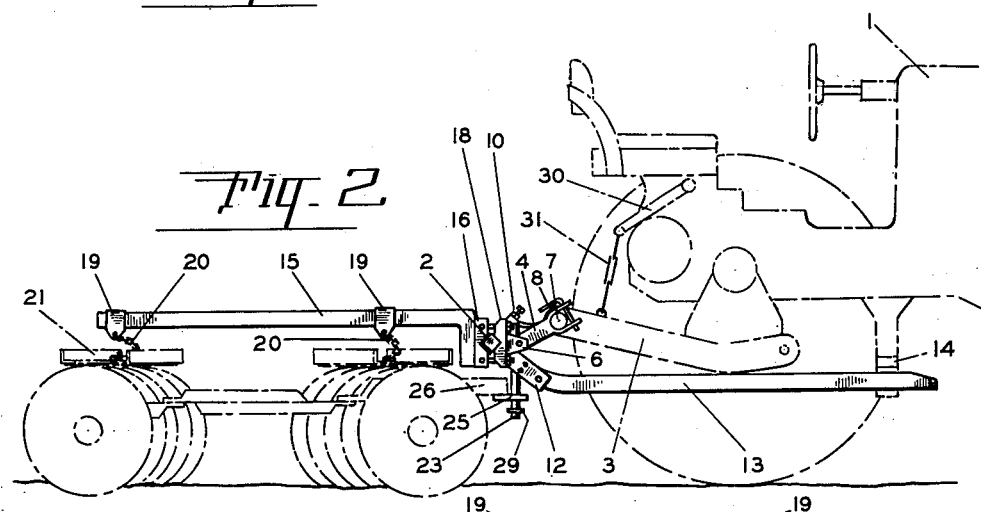
Fig. 2
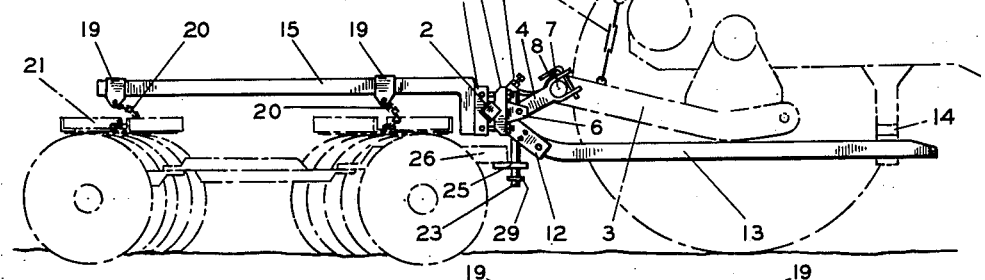
Fig. 3
Fig. 4
INVENTOR.
JOSEPH A. MEISSNER
BY

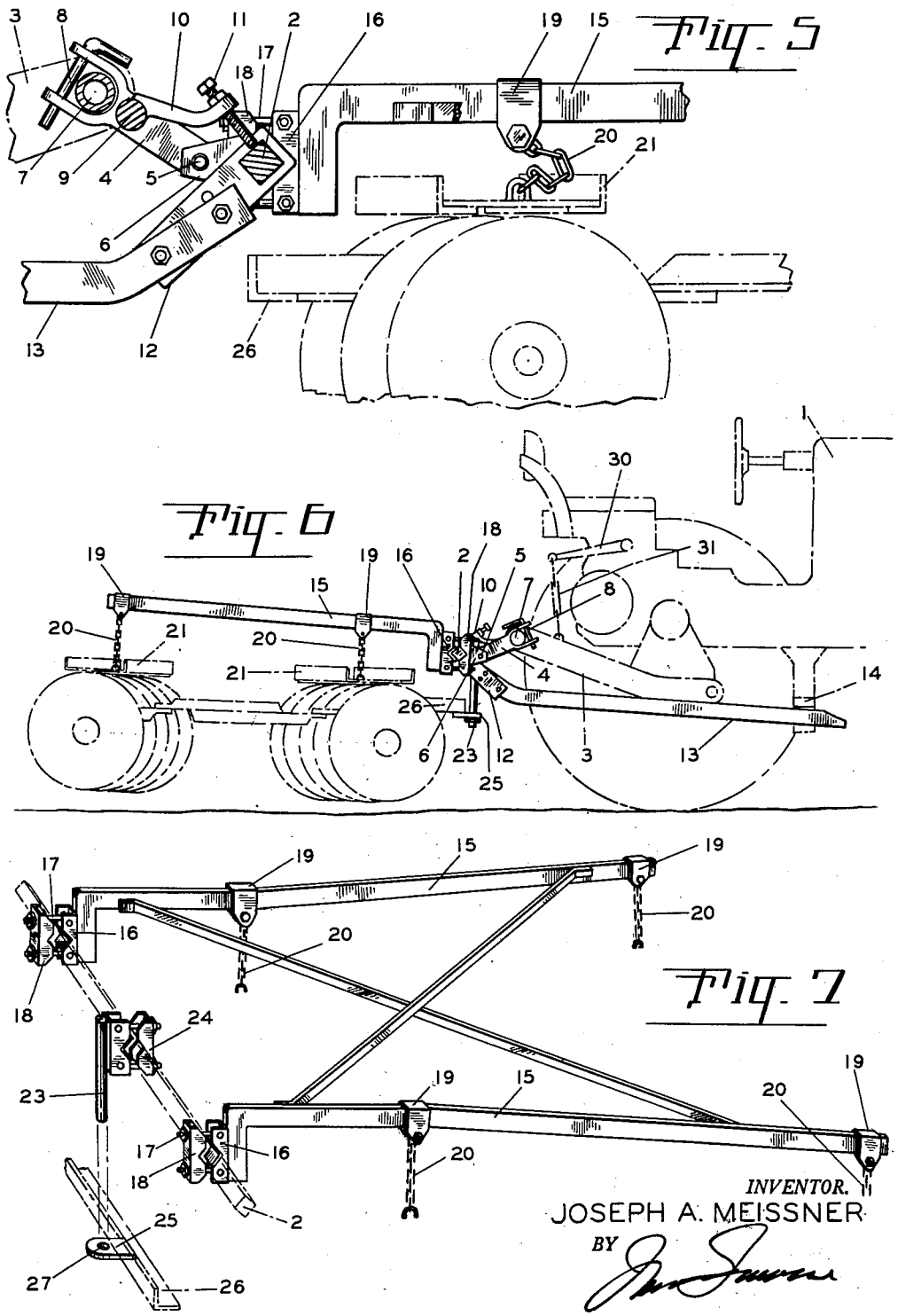

Patented Nov. 11, 1952

2,617,342

UNITED STATES PATENT OFFICE 2,617,342

COMBINATION LIFT AND DRAWBAR FOR TRACTORS

Joseph A. Meissner, Grandview, Wash.

Application March 28, 1950, Serial No. 152,375

5 Claims. (Cl. 97—50)

This invention relates to lifts and draw bars, and is adapted to be used in connection with tractors and implements, particularly in the operation of disks and the like.

The primary object of the invention is to provide a lift and draw bar for tractors that will permit free sidewise movement of the implement drawn thereby as for instance in the operation of disks where side movement is desirable in the proper operation of the same.

The object of permitting the disk behind the tractor to sway from side to side is to avoid obstructions, such as rocks permitting the disk to move around the rock or obstruction instead of having to climb over the same. Further, in making turns on the end of the field, quarter turns can be made without lifting the disk off the ground due to the freedom of side sway of the action of the disk.

Another object of the invention is the provision of a lift for lifting the implement while backing the tractor up and in making turns.

A further object of the invention is the provision of a lift mechanism that will act as a depth gauge in the operation of the implement, at the same time permitting the implement to raise over objects, both up and down and sidewise.

These and other incidental objects will be apparent in the drawings, specification and claims.

Referring to the drawings:

Figure 1 is a plan view of my new and improved lift and draw bar assembly shown in full lines, the tractor and the disk being illustrated by broken lines.

Figure 2 is a side view of the lift and draw bar assembly of Figure 1.

Figure 3 is a diagrammatical view illustrating the principle of permitting the disk to sway from side to side while in operation.

Figure 4 is an enlarged detail sectional view taken on line 4—4 of Figure 1, illustrating the method of connecting the disk to my new and improved draw bar mechanism permitting the disk to move up and down.

Figure 5 is a fragmentary enlarged sectional detail, taken on line 5—5 of Figure 1, illustrating how my new and improved lift and draw bar is associated with the lift mechanism of the tractor and the connection of my machine in relation to the disk.

Figure 6 is the same as Figure 2, except that the disk has been lifted from the ground with my new and improved lifting mechanism.

Figure 7 is a perspective view of the lifting bars and the draw bar assembly which are adapted to fit on to standard tractor tool bars.

Referring more specifically to the drawings:

I have illustrated my new and improved lift and draw bar assembly in connection with a John Deere tractor 1. A transverse tool bar 2 comes with most makes of tractors and is connected to the tractor lifting arms 3 by way of the arms 4. One end of the arms 4 is pivotally connected at 5 to the brackets 6, which are fixedly secured to the tool bar 2. The opposite end of the supporting arms 4 is bifurcated and is adapted to embrace the transverse spacer bar 7 and held thereto by the pins 8. The bar 7 is fixedly secured between the lifting arms 3 by any suitable means. The arms 4 are connected together by a cross member 9, which is fixedly secured therebetween by any suitable means, as for instance welding.

Extending from the cross member 9 is a bracket arm 10, having an adjustable set screw 11 threaded into and locked thereby by a lock nut. The set screw 11 is adapted to engage the tool bar 2 determining the angle of the arms 4 to the brackets 6, thereby providing for an adjustment between the tool bar 2 and the transverse bar 7 of the lifting arms 3. Brackets 12 are fixedly secured to the tool bar 2 and are adapted to receive the tongue 13 which is bolted therebetween at its one end and extending under the tractor, referring to Figure 2, to the bracket 14. All of the above mechanism is now a standard tractor assembly adapted to have tools or implements secured thereto.

My invention consists of attaching the lifting bars 15 to the tool bar 2 by way of the clamps 16, which are fixedly secured to the bars 15. The clamps 16 are adapted to be securely clamped to the tool bar at any desired point and tightened thereon by the bolts 17, which maintains the cap 18 against the bar 2, the same being shaped to fit the square tool bar preventing the lifting arms from rotating thereon.

Clamps 19 are adjustably mounted to the bars 15 and have one end of the chains 20 secured thereto the opposite end of the chains being secured to the frames 21 of the disk, best illustrated in Figures 2, 5, 6 and 7.

The disks are drawn by a special king bolt 23, which is fixedly secured to the clamping unit 24, which is clamped to the bar 2. A special draw bar 25 is secured to the forward frame 26 of the disk by welding or other suitable means, and has an opening 27 therethrough adapted to receive the king pin 23, best illustrated in Figures 2, 4 and 7. The draw bar is prevented from coming off of the king pin by the action of the transverse key 28 associated with the washer 29.

The structure as illustrated and just described allows the disk to raise and lower in its operation freely relative to the tractor, due to the fact that the draw bar 25 can work up and down on the king pin 23.

My new and improved lift and draw bar is illustrated as working with the John Deere tool bar 2, but I wish to be able to use my lifting arms on other types of tractors, which may require that I build the tool bar so that my invention can be adapted to other types of lifts.

I will now describe the operation of my new and improved lift and draw bar for disks. When the lifting arms 3 of the tractor lowers the tool bar 2, including my lifting arms 15, together with the disk assembly, to the position illustrated in Figures 1, 2 and 3, the chains 20 are in a relaxed or slacked off condition. This allows the disk to sway from side to side, as best illustrated in Figure 3, thus permitting the disk to move around obstructions such as rocks, tree roots and so forth. The chains 20 also limit the depth of the disk so that a predetermined depth of cultivation may be obtained. Due to the fact that the draw bar 25 is slidably mounted on the king pin 23, the disk is allowed to float up and down regardless of the depth in the disking operations.

The tool bar 2 remains relatively in one fixed elevation except when the front of the tractor would run over an obstruction, which would raise or lower the bar, or when the rear of the disk may be raised or lowered. Due to the fact that the draw bar unit 25 can slide up and down on the king pin 23, the up and down movement of the tool bar does not effect the operation of the disk, nor vice versa. Further, the king pin 23 and the slack in the chains 20 permits the tractor to make a quarter turn without lifting the implement clear of the ground.

By the raising of the lifting arms of the tractor by the tractor lifting assembly by the power lift arms 30 and their connecting links 31, the disk can be lifted clear of the ground on making turns, which is very desirable or when the disk is not in operation. The arms 15 lift the disks through the chains 20, referring to Figure 6.

As stated above, I do not wish to be limited to the exact mechanical mechanism illustrated relative to the lifts of tractors, as they vary in structure, but I wish to have freedom of depth in the operation of the disk by a draw bar that will permit up and down movement of the same, and also a lifting mechanism that will permit side swaying of the disk while in operation, but at the same time will lift the disk clear of the ground when out of operation.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. Means for connecting a farm implement to a tractor, comprising a stabilizer bar to extend under a tractor, a transverse tool bar secured to the rear end of the stabilizer bar, brackets extending forwardly from the transverse tool bar, bifurcated arms pivoted to the brackets, a transverse spacer bar in advance of and spaced from the transverse tool bar, the bifurcated arms engaging the transverse spacer bar, means between the transverse tool bar and the spacer bar to adjust the vertical movement of the transverse tool bar with reference to the transverse spacer bar, means depending from the transverse tool bar to attach the front end of a farm implement, a pair of rearwardly extending implement lifting arms attached to the transverse tool bar, and adjustable flexible means depending from the rearwardly extending lifting arms to engage a farm implement.

2. Means for connecting a farm implement to a tractor, as defined in claim 1, wherein the means between the transverse tool bar and the transverse spacer bar to adjust the relation between said transverse tool bar and the transverse spacer bar consists of a rod connecting the bifurcated arms, a bracket extending from said rod toward the transverse tool bar, and a screw at the free end of the bracket, said screw engaging the transverse tool bar.

3. Means for connecting a farm implement to a tractor, as defined in claim 1, wherein the means depending from the transverse tool bar to which the front end of a farm implement is attached consists of a vertical rod secured to the transverse tool bar, and means for adjusting the position of said vertical rod on the transverse tool bar.

4. Means for connecting a farm implement to a tractor, comprising a transverse tool bar, means by which the transverse tool bar is connected to a tractor, a stabilizing bar connected to and extending forwardly from the transverse tool bar and under the tractor, means for slidably supporting the forward end of the stabilizing bar, a vertical rod adjustably mounted on and depending from the transverse tool bar, a plate at the lower end of the vertical rod, said plate having an opening through which the vertical rod freely slides, the plate serving to support the front end of a farm implement, a pair of rearwardly extending lifting arms, flexible means secured to the lifting arms to attach a farm implement, means for transversely adjusting the lifting arms on the transverse tool bar, and means for adjustably regulating the vertical movement of the transverse tool bar and the rearwardly extending lifting arms.

5. In combination, a tractor, including a stabilizing bar, a transverse tool bar to which the stabilizing bar is secured, a bracket depending from the tractor to slidably support the forward end of the stabilizing bar, means for vertically adjusting the transverse tool bar, a vertical pin secured to and depending from the transverse tool bar, a farm implement having an opening in its forward end through which the pin slides, bars secured to the transverse tool bar and extending rearwardly therefrom, and flexible means between the bars and the farm implement, whereby to permit sidewise movement when the bars lower the farm implement for operation.

JOSEPH A. MEISSNER.

REFERENCES CITED

The following references are of record in the file of this patent:

UNITED STATES PATENTS

| Number | Name | Date |
| --- | --- | --- |
| 1,538,757 | Swindall | May 19, 1925 |
| 1,593,258 | Haworth | July 20, 1926 |
| 1,946,686 | Graham et al. | Feb. 13, 1934 |
| 2,306,744 | Morkoski | Dec. 29, 1942 |
| 2,312,258 | Martin | Feb. 23, 1943 |
| 2,336,152 | Rude | Dec. 7, 1943 |
| 2,336,410 | McKay | Dec. 7, 1943 |
| 2,398,147 | McKay | Apr. 9, 1946 |
| 2,440,550 | Martin | Apr. 27, 1948 |